(12) United States Patent
Park

(10) Patent No.: US 7,711,860 B2
(45) Date of Patent: May 4, 2010

(54) METHOD AND APPARATUS TO ESTABLISH CLASS OF USB DEVICE

(75) Inventor: Bong-wook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 882 days.

(21) Appl. No.: 11/334,551

(22) Filed: Jan. 19, 2006

(65) Prior Publication Data

US 2006/0161701 A1 Jul. 20, 2006

(30) Foreign Application Priority Data

Jan. 19, 2005 (KR) .................. 10-2005-0005000

(51) Int. Cl.
*G06F 3/00* (2006.01)
(52) U.S. Cl. .................. 710/8; 710/11; 710/15; 710/62; 710/63
(58) Field of Classification Search ............... 710/8, 710/11, 15, 62, 63
See application file for complete search history.

(56) References Cited

U.S. PATENT DOCUMENTS

| | | | | |
|---|---|---|---|---|
| 2004/0004671 A1* | 1/2004 | Takahashi | ................ | 348/375 |
| 2004/0212700 A1* | 10/2004 | Prabhu et al. | .......... | 348/231.99 |
| 2005/0060447 A1* | 3/2005 | Tanaka | ................ | 710/62 |
| 2005/0140789 A1* | 6/2005 | Yasuda | ................ | 348/207.2 |
| 2005/0257225 A1* | 11/2005 | Choi et al. | ................ | 719/321 |
| 2006/0109349 A1* | 5/2006 | Takashima | ............ | 348/207.1 |

FOREIGN PATENT DOCUMENTS

| | | |
|---|---|---|
| CN | 1525285 A | 9/2004 |
| EP | 1221653 A2 | 7/2002 |
| JP | 2001-222503 | 8/2001 |
| JP | 2001-290612 | 10/2001 |
| JP | 2001-290753 | 10/2001 |
| JP | 2003-233576 | 8/2003 |
| JP | 2003-256170 | 9/2003 |
| JP | 2004-112078 | 4/2004 |
| KR | 2003-9514 | 1/2003 |
| WO | WO 2005001701 A1 * | 1/2005 |

OTHER PUBLICATIONS

Chinese Office Action dated Nov. 30, 2007 issued in CN 200610005894.9.

* cited by examiner

*Primary Examiner*—Eron J Sorrell
(74) *Attorney, Agent, or Firm*—Stanzione & Kim, LLP

(57) ABSTRACT

A method and apparatus to establish a class of a universal interface device, and more particularly, a method and apparatus to receive classes supported by the universal interface device and to establish a class among the received classes supported by the universal interface device as the class of the universal interface device in a system in which a universal interface host and the universal interface device are connected via a universal interface. The method of establishing the class of the universal interface device includes receiving the classes supported by the universal interface device, establishing a class selected among the received classes of the universal interface device as the class of the universal interface device, and recognizing the established class as the class of the universal interface device.

17 Claims, 5 Drawing Sheets

METHOD AND APPARATUS TO ESTABLISH CLASS OF USB DEVICE

CROSS-REFERENCE TO RELATED APPLICATIONS

This application claims the benefit under 35 U.S.C. § 119 of Korean Patent Application No. 2005-5000, filed on Jan. 19, 2005, in the Korean Intellectual Property Office, the disclosure of which is incorporated herein in its entirety by reference.

BACKGROUND OF THE INVENTION

1. Field of the Invention

The present general inventive concept relates to a method and apparatus to establish a class of a universal interface device, and more particularly, to a method and apparatus to receive classes supported by the universal interface device and to establish a class among the received classes supported by the universal interface device as a class of the universal interface device in a system in which a universal interface host and the universal interface device are connected via a universal interface.

2. Description of the Related Art

The standard specification of a universal serial bus (USB) classifies a USB device as a storage medium, a printing medium, a human interface medium, a communication medium, etc. A USB class describes a group of USB devices with common functions or attributes. Devices having a USB host function support various classes of USB devices. Devices having a USB device function are also developed to support various classes of USB devices.

FIGS. 1A and 1B illustrate conventional systems in which a digital still camera 100 and an image printing device 300 are connected via a USB. The digital still camera 100 supports both a still image class (SIC) and a mass storage class (MSC). A user obtains a predetermined image using the digital still camera 100 and stores the obtained image in a predetermined storage unit (not illustrated) of the digital still camera 100. As illustrated in FIG. 1A, the digital still camera 100 is connected via a host computer 200 to the image printing device 300. In order to print an image file stored in the digital still camera 100 connected via a host computer 200 to the image printing device 300, the user must change a USB class of the digital still camera 100 into the MSC and connect the digital still camera 100 and the host computer 200. As illustrated in FIG. 1B, in order to print the image file stored in the digital still camera 100 using just the image printing device 300, the user must disconnect the digital still camera 100 from the host computer 200, change the USB class of the digital still camera 100 into the SIC, and connect the digital still camera 100 directly to the image printing device 300.

herefore, the user must change the USB class of the digital still camera 100 into the MSC or the SIC according to whether the digital still camera 100 is connected to the host computer 200 or the image printing device 300, respectively. When the USB class of the digital still camera 100 is erroneously established, it is inconvenient that the user must disconnect the digital still camera 100 from the host computer 200 or the image printing device 300, correct the USB class of the digital still camera 100, and reconnect the digital still camera 100 to the host computer 200 or the image printing device 300.

SUMMARY OF THE INVENTION

The present general inventive concept provides a method of receiving classes supported by a universal interface device and establishing a class among the received classes supported by the universal interface device as a class of the universal interface device in a system in which a universal interface host and the universal interface device are connected via a universal interface.

The present general inventive concept also provides an apparatus to receive classes supported by a universal interface device and to establish a class among the received classes supported by the universal interface device as a class of the universal interface device in a system in which a universal interface host and the universal interface device are connected via a universal interface.

The present general inventive concept also provides a system in which a universal interface host and a universal interface device are connected via a universal interface, the universal interface host receives classes supported by the universal interface device, and a class among the received classes supported by the universal interface device is established as a class of the universal interface device.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method of establishing a class of a universal interface device in a network to which the universal interface device and a universal interface host are connected, the method including receiving classes supported by the universal interface device, establishing a class among the received classes supported by the universal interface device as the class of the universal interface device, and recognizing the established class of the universal interface device as the class of the universal interface device.

The method may further include inputting a first user command to request the classes supported by the universal interface device before receiving the classes supported by the universal interface device, and displaying the received classes supported by the universal interface device after receiving the classes supported by the universal interface device.

The establishing of the class among the received classes supported by the universal interface device as the class of the universal interface device may include inputting a second user command to select one of the displayed classes supported by the universal interface device generating a control signal to establish the class selected according to the second user command as the class of the universal interface device, and establishing the class of the universal interface device as the selected class according to the control signal.

The foregoing and/or other aspects of the present general inventive concept are also achieved by providing a method of controlling a universal interface device by a universal interface host connected thereto through a universal interface, the method including requesting classes supported by the universal interface device from the universal interface device, selecting one of the requested classes supported by the universal interface device, and transmitting a control signal to the universal interface device to control the universal interface device to establish the class of the universal interface device as the selected class.

The foregoing and/or other aspects of the present general inventive concept are also achieved by providing a method of establishing a class in a universal interface device connected to a universal interface host through a universal interface, the method including transmitting classes supported by the universal interface device to the universal interface host, receiving a control signal specifying one of the transmitted classes supported by the universal interface device from the universal interface host, and establishing the class of the universal interface device as the specified class based on the control signal.

The foregoing and/or other aspects of the present general inventive concept are also achieved by providing a computer readable medium having embodied thereon a computer program to perform a method of establishing a class of a universal interface device in a network to which the universal interface device and a universal interface host are connected, the method including receiving classes supported by the universal interface device, establishing a class selected among the received classes supported by the universal interface device as the class of the universal interface device, and recognizing the established class of the universal interface device as the class of the universal interface device.

The foregoing and/or other aspects of the present general inventive concept are also achieved by providing a computer readable medium containing executable codes to perform a method of a universal interface host controlling a universal interface device connected to the universal interface host through a universal interface, the method including requesting classes supported by the universal interface device from the universal interface device, selecting one of the requested classes supported by the universal interface device, and transmitting a control signal to the universal interface device to control the universal interface device to establish the class of the universal interface device as the selected class.

The foregoing and/or other aspects of the present general inventive concept are also achieved by providing a computer readable medium containing executable codes to perform a method of establishing a class in a universal interface device connected to a universal interface host through a universal interface, the method including transmitting classes supported by the universal interface device to the universal interface host, receiving a control signal specifying one of the transmitted classes supported by the universal interface device from the universal interface host, and establishing the class of the universal interface device as the specified class based on the control signal.

The foregoing and/or other aspects of the present general inventive concept are also achieved by providing an apparatus to establish a class of a universal interface device, the apparatus including a connector connectable to the universal interface device via a universal interface, an establisher to establish a class selected from classes supported by the universal interface device received from the universal interface device via the connector as the class of the universal interface device, and a recognizer to recognize the established class of the universal interface device as the class of the universal interface device.

The apparatus may further include a user interface to input a first user command to request the classes supported by the universal interface device and a second user command to select a class among the received classes of the universal interface device, and a display unit to display the received classes supported by the universal interface device.

The establisher may include a reception controller to generate a first control signal to request the classes supported by the universal interface device according to the first user command, to transmit the first control signal to the universal interface device via the connector, and to receive the classes supported by the universal interface device transmitted from the universal interface device in response to the first control signal via the connector, a selection controller to select the class among the classes supported by the universal interface device according to the second user command, and an establishment controller to generate a second control signal to establish the selected class as the class of the universal interface device and to transmit the second control signal to the universal interface device via the connector.

The foregoing and/or other aspects of the present general inventive concept are also achieved by providing a universal interface host to control a class of a universal interface device, including a connector connectable to a universal interface device through a universal interface, and a controller to request classes supported by the universal interface device from the universal interface device, to select one of the classes supported by the universal interface device, and to transmit a control signal to the universal interface device to control the universal interface device to establish the class of the universal interface device as the selected class.

The foregoing and/or other aspects of the present general inventive concept are also achieved by providing a universal interface device, including a connector connectable to the universal host through a universal interface, and a controller to transmit classes supported by the universal interface device to the universal interface host through the connector and to set a class of the universal interface device based on a control signal received from the universal interface host through the connector.

The foregoing and/or other aspects of the present general inventive concept are also achieved by providing a system in which a universal interface device and a universal interface host are connected using a universal interface, the system including the universal interface host to select a class among classes supported by the universal interface device, to establish the selected class as the class of the universal interface device, and to recognize the established class of the universal interface device as the class of the universal interface device, and the universal interface device to transmit the classes supported by the universal interface device to the universal interface host and to establish the class selected by the universal interface host as the class of the universal interface device.

The foregoing and/or other aspects of the present general inventive concept are also achieved by providing a universal interface system, including a universal interface device which supports one or more classes, and a universal interface host connectable to the universal interface device through a universal interface to select one of the classes supported by the universal interface device and to control the universal interface device to establish the selected class as a class of the universal interface device.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
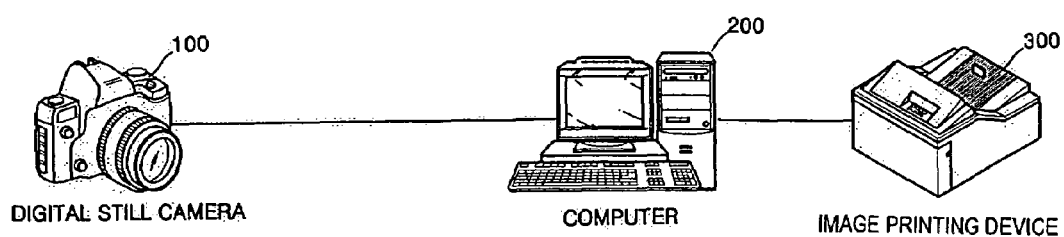
FIGS. 1A and 1B are views illustrating conventional systems in which a digital still camera and a printing device are connected via a universal serial bus (USB)
Figure 1B:

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
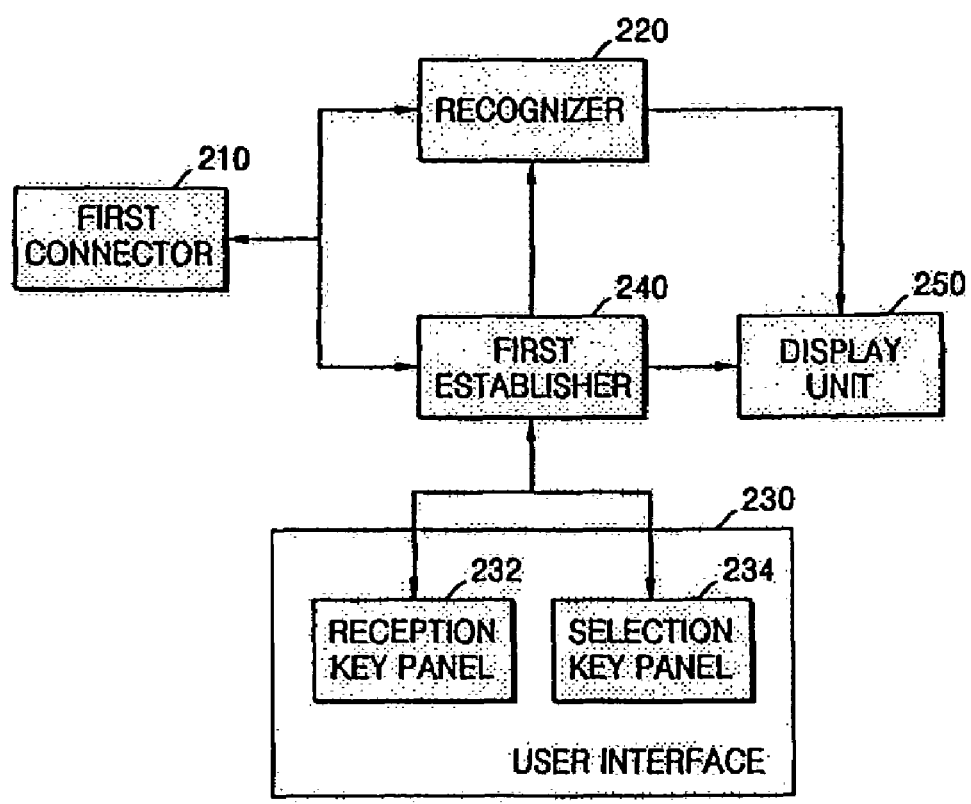
FIG. 2 is a block diagram illustrating a device to establish classes of a USB device according to an embodiment of the present general inventive concept.

FIG. 2 is a block diagram illustrating a device to establish a class of a USB device according to an embodiment of the present general inventive concept. Although a USB is described as an example of a universal interface in the present embodiment, other universal interfaces may also be used according to various embodiments of the present general inventive concept. Referring to FIG. 2, the device for establishing the class of the USB device (not illustrated) includes a first connector 210, a recognizer 220, a user interface 230, a first establisher 240, and a display unit 250. The first connector 210 is connected to a USB by which the first connector 210 can communicate with the USB device, such as a digital camera, a mass storage medium, etc.

When the USB device is connected to the first connector 210 via the USB, the recognizer 220 receives a descriptor of the USB device via the first connector 210 and recognizes the USB device. The descriptor includes information regarding the USB device, such as class information of the USB device necessary for recognizing the USB device. Based on the class information of the USB device included in the descriptor, the recognizer 220 determines the class of the USB device and recognizes the function of the USB device according to the determined class. The determined class of the USB device can be displayed on the display unit 250.

The USB device may be capable of supporting more than one class. Accordingly, the class of the USB device can be changed to another class supported by the USB device. A user command to change the class of the USB device can be input in the user interface 230. The user interface 230 can include a reception key panel 232 and a selection key panel 234. A first user command to control the first establisher 240 to request and receive classes supported by the USB device is input via the reception key panel 232. A second user command to select a class among the classes supported by the USB device is input via the selection key panel 234.

The first establisher 240 requests the classes supported by the USB device from the USB device via the first connector 210 according to the first user command and then receives the requested classes supported by the USB device from the USB device. That is, the first establisher 240 generates a first control signal to request the classes supported by the USB device according to the first user command, transmits the first control signal to the USB device via the first connector 210, and receives the classes supported by the USB device from the USB device according to the first control signal. The received classes supported by the USB device can be displayed on the display unit 250.

The first establisher 240 selects a class among the received classes supported by the USB device according to the second user command, generates a second control signal to establish the selected class as a class of the USB device, and transmits the second control signal to the USB device using the first connector 210 to control the USB device to establish the USB device class as the selected class.

The USB device establishes the USB device class as the selected class based on the second control signal and the recognizer 220 re-recognizes the class of the USB device as the selected class. That is, the recognizer 220 receives an updated descriptor containing class information regarding the selected class and recognizes the class of the USB device as the selected class based on the received updated descriptor.

Figure 3:
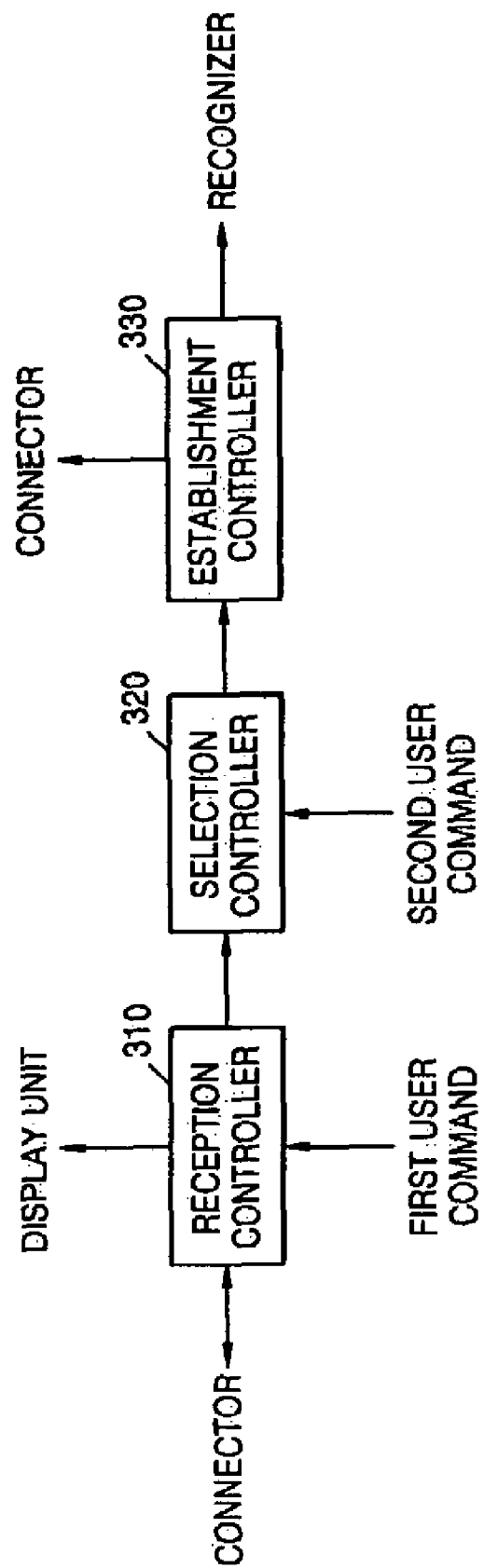
FIG. 3 is a block diagram illustrating a first establisher of the device of FIG. 2.

FIG. 3 is a block diagram illustrating an embodiment of the first establisher 240 of FIG. 2. Referring to FIG. 3, the first establisher 240 can include a reception controller 310, a selection controller 320, and an establishment controller 330.

The reception controller 310 generates the first control signal to request the classes supported by the USB device according to the first user command input by the reception key panel 232, and transmits the first control signal to the USB device via the first connector 210. The reception controller 310 then receives the classes supported by the USB device from the USB device in response to the first control signal and provides the received classes supported by the USB device to the display unit 250 and the selection controller 320.

The selection controller 320 selects a class from the displayed classes supported by the USB device according to the second user command input by the selection key panel 234. The establishment controller 330 provides the second control signal to the USB device via the first connector 210 to control the USB device to establish the class of the USB device as the selected class. The second control signal is also provided to the recognizer 220. When the recognizer 220 receives the second control signal, the recognizer 220 requests the updated descriptor from the USB device, receives the requested updated descriptor from the USB device, and re-recognizes the class of the USB device according to the updated descriptor received from the USB device.

Figure 4:
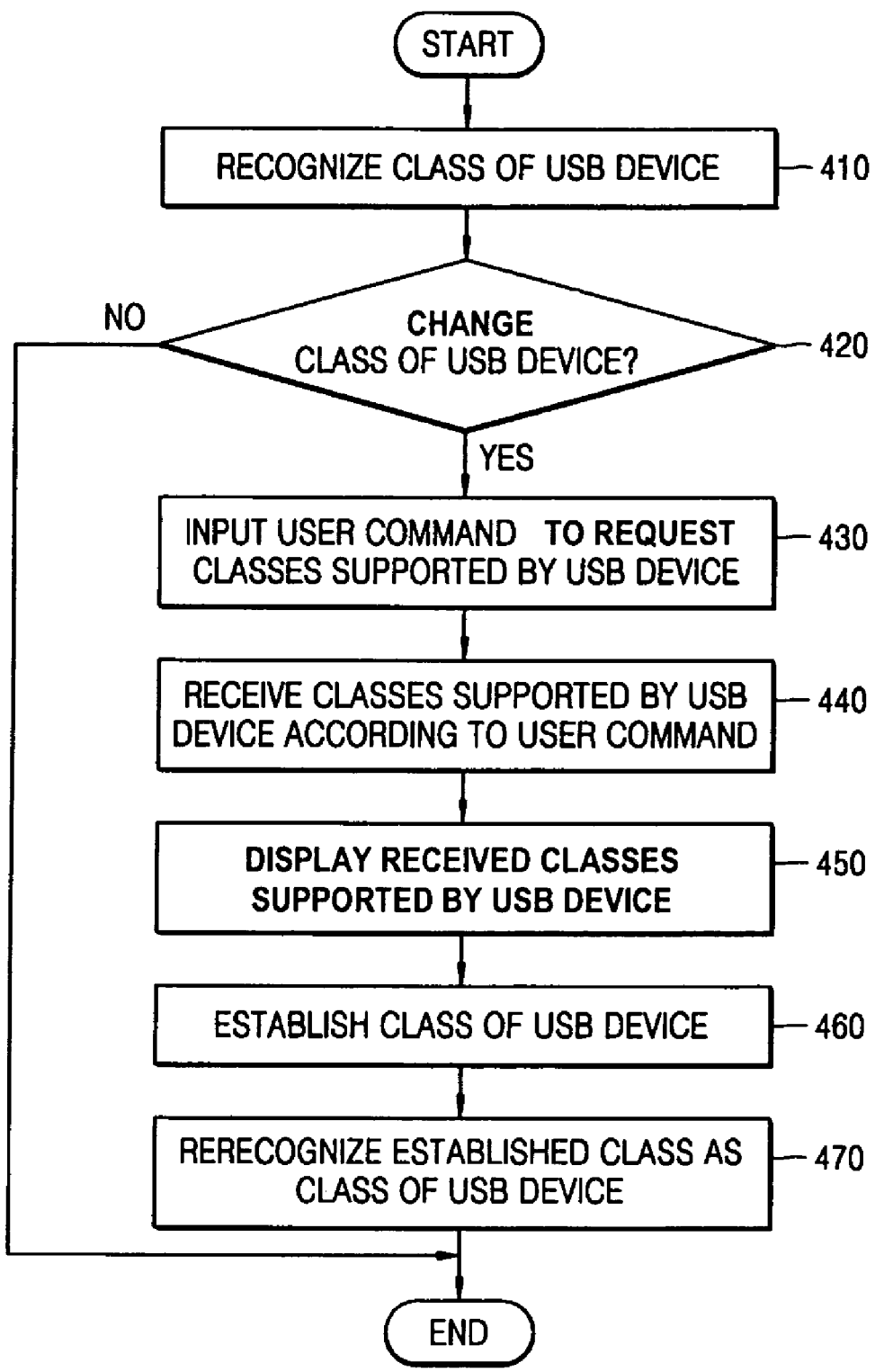
FIG. 4 is a flowchart illustrating a method of establishing a class of a USB device according to an embodiment of the present general inventive concept.

FIG. 4 is a flowchart illustrating a method of establishing the class of a USB device according to an embodiment of the present general inventive concept. Referring to FIG. 4, a USB device is connected to the first connector 210 and a descriptor of the USB device is received. The recognizer 220 recognizes the class of the USB device based on the descriptor (Operation 410). The recognized class of the USB device is displayed on the display unit 250. It is determined whether the class of the USB device should be changed based on the displayed class of the USB device (Operation 420). When it is determined that the class of the USB device should be changed, a first user command to request classes supported by the USB device is input to the first establisher 240 (Operation 430). A first control signal that requests the classes supported by the USB device is transmitted to the USB device based on the first user command, and the classes supported by the USB device are received based on the transmitted first control signal (Operation 440).

The received classes are then displayed on the display unit 250 (Operation 450). A class among the displayed classes is selected as the class of the USB device and the USB device is controlled to establish the selected class as the class of the USB device (Operation 460). A new descriptor of the USB device that reflects the established class of the USB device is transmitted to the recognizer 220 and the class of the USB device is re-recognized according to the transmitted new descriptor (Operation 470).

If a predetermined USB device is connected to the first connector 210 according to a field in which the present general inventive concept is applied, Operations 420 and 430 may be skipped, and Operation 440 is performed. That is, if the USB device is connected to the first connector 210 and recognized, classes supported by the USB device can automatically be received and displayed on the display unit 250. A user can then select a class among the displayed classes, and the selected class can be established as the class of the USB device. Alternatively, a predetermined class among the classes supported by the USB device can be automatically selected and established as the class of the USB device.

Figure 5:
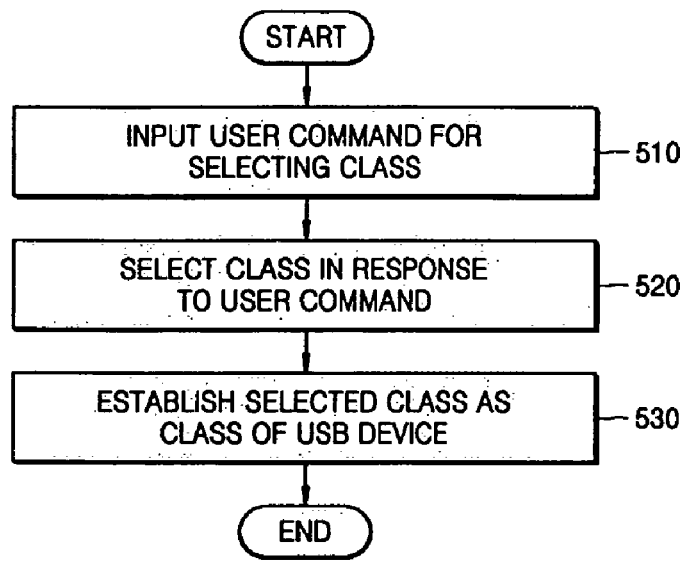
FIG. 5 is a flowchart illustrating operations to establish the class of the USB device according to the method of establishing the class of the USB device illustrated in FIG. 4.

FIG. 5 is a flowchart illustrating operations to establish the class of the USB device according to the method of establishing the class of the USB device illustrated in FIG. 4. Referring to FIG. 5, after receiving the classes supported by the USB device from the USB device, the received classes are displayed on the display unit 250. A second user command to select one of the displayed classes supported by the USB device is then input (Operation 510). The class of the USB device is selected according to the second user command (Operation 520). A second control signal to establish the selected class as the class of the USB device is generated and the second control signal is transmitted to the USB device. The USB device establishes the USB device class as the selected class according to the second control signal (Operation 530). An updated descriptor which reflects the established class of the USB device according to the second control signal is received from the USB device and the class of the USB device is re-recognized according to the received updated descriptor.

Figure 6:
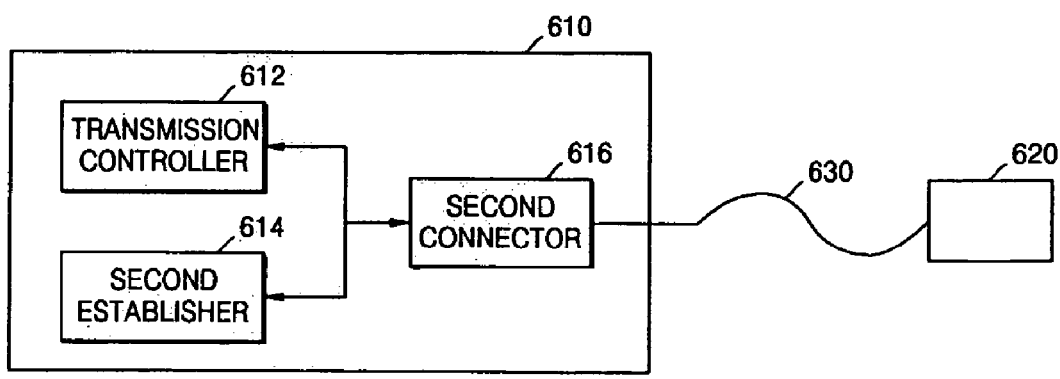
FIG. 6 is a block diagram illustrating a system that establishes a class of a USB device according to an embodiment of the present general inventive concept.

FIG. 6 is a block diagram of a system that establishes the class of a USB device according to an embodiment of the present general inventive concept. Referring to FIG. 6, the system includes a USB device 610 and a USB host 620. The USB device 610 and the USB host 620 are connected via a USB 630. Other interfaces can be used according to the field in which the present general inventive concept is applied within the scope of the present general inventive concept. The USB host 620 is substantially the same as the device to establish the class of the USB device as illustrated in FIGS. 2 and 3.

The USB device 610 includes a transmission controller 612, a second establisher 614, and a second connector 616. The transmission controller 612 transmits classes supported by the USB device 610 to the USB host 620 via the second connector 616 according to a first control signal that requests the classes supported by the USB device 610. The first control signal is received from the USB host 620 via the second connector 616.

The USB host 620 selects a class among the transmitted classes supported by the USB device 610, generates a second control signal to establish the selected class as the class of the USB device 610, and transmits the second control signal to the USB device 610. The second establisher 614 receives the second control signal via the second connector 616 and establishes the class of the USB device 610 as the selected class in response to the second control signal.

It is possible for the present general inventive concept to be realized on a computer-readable storage medium as a computer-readable code. Computer-readable storage mediums include many types of recording devices that store computer system-readable data. ROMs, RAMs, CD-ROMs, magnetic tapes, floppy discs, optical data storage, etc. are used as computer-readable storage mediums.

For example, the present general inventive concept may be embodied as a computer readable medium containing executable codes to perform a method of a universal interface host controlling a universal interface device connected to the universal interface host through a universal interface, the method including requesting classes supported by the universal interface device from the universal interface device, selecting one of the requested classes supported by the universal interface device, and transmitting a control signal to the universal interface device to control the universal interface device to establish the class of the universal interface device as the selected class.

The present general inventive concept may also be embodied as a computer readable medium containing executable codes to perform a method of establishing a class in a universal interface device connected to a universal interface host through a universal interface, the method including transmitting classes supported by the universal interface device to the universal interface host, receiving a control signal specifying one of the transmitted classes supported by the universal interface device from the universal interface host, and establishing the class of the universal interface device as the specified class based on the control signal.

The method and apparatus to establish the class of a USB device establishes the class of the USB device to a class among classes supported by the USB device when the USB device is connected to a USB host. A user can easily change the class of the USB device when the class of the USB device is erroneously established without disconnecting the USB device from the USB host.

For example, when the USB host is an image printing device and the USB device is a digital camera, and the USB host and the USB device support both the USB class of a digital still camera and the USB class of a mass storage medium, the user can easily establish the USB class of the digital still camera as a desired class through the image printing device even if the digital camera is set to the mass storage medium class when connected to the image printing device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of establishing a class of a universal interface device in a network to which the universal interface device and a universal interface host are connected, the method comprising:

inputting a first user command to request classes supported by the universal interface device;

receiving at the universal interface host all of the classes supported by the universal interface device;

establishing a class among the received classes supported by the universal interface device as the class of the universal interface device; and recognizing the established class of the universal interface device as the class of the universal interface device, wherein the universal interface comprises a universal serial bus (USB).

2. The method of claim 1, further comprising:

displaying the received classes supported by the universal interface device after receiving the classes supported by the universal interface device.

3. The method of claim 2, wherein the establishing of the class among the received classes supported by the universal interface device as the class of the universal interface device comprises:

inputting a second user command to select one of the displayed classes supported by the universal interface device;

generating a control signal to establish the class selected according to the second user command as the class of the universal interface device; and establishing the class of the universal interface device as the selected class according to the control signal.

4. The method of claim 3, wherein the universal interface device is a digital camera and the universal interface host is an image printing device.

5. A method of controlling a universal interface device by a universal interface host connected thereto through a universal interface, the method comprising:
   requesting all classes supported by the universal interface device from the universal interface device;
   receiving the requested classes supported by the universal interface device from the universal interface device;
   displaying the received classes supported from the universal interface device;
   selecting one of the displayed classes supported by the universal interface device; and
   transmitting a control signal to the universal interface device, from the universal interface host, to control the universal interface device to establish the class of the universal interface device as the selected class.

6. The method of claim 5, wherein the selecting of one of the requested classes supported by the universal interface device comprises:
   automatically selecting a predetermined class among the classes supported by the universal interface device.

7. The method of claim 5, further comprising:
   receiving a descriptor from the universal interface device after controlling the universal interface device to establish the class of the universal interface device as the selected class; and
   recognizing the class of the universal interface device as the selected class based on the received descriptor.

8. A method of establishing a class in a universal interface device connected to a universal interface host through a universal interface, the method comprising:
   transmitting all classes supported by the universal interface device to the universal interface host;
   receiving a control signal specifying one of the transmitted classes supported by the universal interface device from the universal interface host; and
   establishing the class of the universal interface device as the specified class based on the control signal.

9. An image forming device to establish the class of a universal interface device, the apparatus comprising:
   a connector connectable to the universal interface device via a universal interface;
   an establisher to establish a class selected from all classes supported by the universal interface device received from the universal interface device via the connector as the class of the universal interface device; and
   a recognizer to recognize the established class of the universal interface device as the class of the universal interface device.

10. The apparatus of claim 9, wherein the universal interface is a USB.

11. The apparatus of claim 10, further comprising:
   a user interface to input a first user command to request the classes supported by the universal interface device and a second user command to select a class among the received classes supported by the universal interface device.

12. The apparatus of claim 11, further comprising:
   a display unit to display the received classes supported by the universal interface device.

13. The apparatus of claim 12, wherein the establisher comprises:
   a reception controller to generate a first control signal to request classes supported by the universal interface device according to the first user command, to transmit the first control signal to the universal interface device via the connector, and to receive the classes supported by the universal interface device transmitted from the universal interface device in response to the first control signal via the connector;
   a selection controller to select the class among the classes supported by the universal interface device according to the second user command; and
   an establishment controller to generate a second control signal to establish the selected class as the class of the universal interface device and to transmit the second control signal to the universal interface device via the connector.

14. The apparatus of claim 9, wherein the universal interface device is a digital camera and the apparatus further includes an image printing device connected to the camera via the universal interface.

15. A system in which a universal interface device and a universal interface host are connected using a universal interface, the system comprising:
   the universal interface host to select a class among all classes supported by the universal interface device, to establish the selected class as the class of the universal interface device, and to recognize the established class of the universal interface device as the class of the universal interface device; and
   the universal interface device to transmit the classes supported by the universal interface device to the universal interface host and to establish the class selected by the universal interface host as the class of the universal interface device,
   wherein the universal interface comprises a USB.

16. The system of claim 15, wherein:
   the universal interface host comprises:
   a first establisher having a reception controller, a selection and an establishment controller,
   the reception controller to generate a first control signal to request the classes supported by the universal interface device, to transmit the first control signal to the universal interface device, and to receive the classes supported by the universal interface device from the universal interface device in response to the first control signal,
   the selection controller to select a class among the classes supported by the universal interface device,
   the establishment controller to generate a second control signal to establish the selected class as the class of the universal interface device and to transmit the second control signal to the universal interface device, and
   a recognizer to recognize the established class of the universal interface device as the class of the universal interface device; and
   the universal interface device comprises:
   a transmission controller to transmit the classes supported by the universal interface device to the universal interface host in response to the first control signal, and a second establisher to establish the class of the universal interface device as the selected class according to the second control signal.

17. A universal interface system, comprising:
a universal interface device which supports one or more classes; and
a universal interface host connectable to the universal interface device through a universal interface to select one of the classes of all classes supported by the universal interface device and to control the universal interface device to establish the selected class as a class of the universal interface device.

\* \* \* \* \*